United States Patent
Côté et al.

(10) Patent No.: US 12,371,337 B2
(45) Date of Patent: Jul. 29, 2025

(54) USE OF CALCIUM FLUORIDE IN THE BAYER PROCESS

(71) Applicant: Rio Tinto Alcan International Limited, Montreal (CA)

(72) Inventors: Lisa Côté, Canton-Tremblay (CA); Sébastien Fortin, Chicoutimi (CA); Élizabeth Gingras-Lafleur, Chicoutimi (CA)

(73) Assignee: Rio Tinto Alcan International Limited, Montreal (CA)

( * ) Notice: Subject to any disclaimer, the term of this patent is extended or adjusted under 35 U.S.C. 154(b) by 559 days.

(21) Appl. No.: 17/433,450

(22) PCT Filed: Feb. 24, 2020

(86) PCT No.: PCT/IB2020/051564
§ 371 (c)(1),
(2) Date: Aug. 24, 2021

(87) PCT Pub. No.: WO2020/174372
PCT Pub. Date: Sep. 3, 2020

(65) Prior Publication Data
US 2022/0135417 A1      May 5, 2022

(30) Foreign Application Priority Data
Feb. 25, 2019   (AU) .................. 2019900590

(51) Int. Cl.
*C01F 7/0633*   (2022.01)
*C01F 7/0613*   (2022.01)
(Continued)

(52) U.S. Cl.
CPC .......... *C01F 7/0633* (2013.01); *C01F 7/0613* (2013.01); *C01F 7/0646* (2013.01); *C01F 7/47* (2013.01)

(58) Field of Classification Search
None
See application file for complete search history.

(56) References Cited

U.S. PATENT DOCUMENTS 2,019,553 A   11/1935   Willmore et al.
2,421,918 A   6/1947   Anderson et al.
(Continued)

FOREIGN PATENT DOCUMENTS

CA        716486 A       8/1965
CN        108439444 A    8/2018
(Continued)

OTHER PUBLICATIONS

Adamson, A., et al. Basic Principles of Bayer Process Design. In Essential Readings in Light Metals, 2016. ISBN : 978-3-319-48574-4 (Year: 2016).*
(Continued)

*Primary Examiner* — Anthony J Zimmer
*Assistant Examiner* — Zachary John Baum
(74) *Attorney, Agent, or Firm* — Banner & Witcoff, Ltd.

(57) ABSTRACT

A Bayer process includes contacting bauxite and calcium fluoride with sodium hydroxide and forming a slurry, with the calcium fluoride may provide at least 1 wt. % of the calcium added to the process, and precipitating alumina from the slurry.

21 Claims, 9 Drawing Sheets

Small scale Experiments Flowsheet (Single-stream Configuration)

(51) Int. Cl.
*C01F 7/0646* (2022.01)
*C01F 7/47* (2022.01)

(56) References Cited

U.S. PATENT DOCUMENTS

| | | | |
|---|---|---|---|
| 3,116,971 | A | 1/1964 | Hrishikesan et al. |
| 4,487,756 | A | 12/1984 | Mizrah et al. |
| 5,470,559 | A * | 11/1995 | Grolman ............... C25C 3/08 423/489 |
| 2004/0146455 | A1 | 7/2004 | Rosenberg et al. |

FOREIGN PATENT DOCUMENTS

| | | | | |
|---|---|---|---|---|
| GB | 172087 | A | 11/1921 | |
| GB | 621569 | A | 4/1949 | |
| GB | 996661 | A | 6/1965 | |
| KR | 20150011276 | A | 1/2015 | |
| WO | 1998030499 | A1 | 7/1998 | |
| WO | WO-2006081626 | A1 * | 8/2006 | ............ C01F 7/0606 |
| WO | 2009115177 | A1 | 9/2009 | |

OTHER PUBLICATIONS

Smirnov, M. Formation of sodium fluorite in autoclave leaching of bauxites. Tsvetnye Metally (Moscow Federation), 34(3), 1961, p. 62-66. (Year: 1961).*
Holywell, G. and Breault, R. An overview of useful methods to treat, recover, or recycle spent potlining. JOM 65, 1441-1451 (2013). https://doi.org/10.1007/s11837-013-0769-y (Year: 2013).*
Apr. 1, 2019—(AU) Search Report—App. No. 2019900590—22 pages.
Apr. 30, 2020—(WO) International Search Report and Written Opinion—App. No. PCT/IB2020/051564—8 pages.
Smirnov, M.N. "Formation of sodium fluorite in autoclave leaching of bauxites", Tsvetnye Metally (Moscow, Russian Federation) (1961), 34(No. 3), pp. 62-66.
Gu et al., "Behaviour of Some Additives in Bayer Digestion Process of Diasporic Bauxite". In: Das SK (ed) Light Metals 1993. The Minerals, Metals and Materials Society, Warrendale, PA, pp. 27-33 (1993).

* cited by examiner

Small scale Experiments Flowsheet (Single-stream Configuration)

General Digestion Process Flowsheet (Double-stream Configuration)

Digestion Results with "LIE" CaF2 (mean values ± std. dev) - A/C Ratio (target = -----)

Digestion results with "LLE" CaF2 - Breakpoint analysis

Digestion with "LLE" CaF₂ – Fluoride concentration (mean values ± std. dev)

Digestion with "LLE" CaF$_2$ – Phosphorus concentration (mean values ± std. dev)

Digestion with "HLE" CaF2 – Phosphorus and Fluoride accumulation (mean values)

Digestion with "LLE" CaF2 – Phosphorus and Fluoride accumulation (mean values)

Digestion with "LIE" CaF2 – Carbonate concentration (mean values ± std. dev)

USE OF CALCIUM FLUORIDE IN THE BAYER PROCESS

CROSS-REFERENCE TO RELATED APPLICATIONS

This application is a U.S. National Stage application under 35 U.S.C. § 371 of International Application PCT/IB2020/051564 (published as WO 2020/174372), filed on Feb. 24, 2020, which claims the benefit of priority to Australia Application No. 2019900590, filed on Feb. 25, 2019. Each of these prior applications is hereby incorporated by reference in its entirety.

TECHNICAL FIELD

The present invention relates to the Bayer process for producing alumina. In particular, the present invention relates to the use of calcium fluoride in the Bayer process.

BACKGROUND ART

The term "alumina" is understood herein to mean aluminium oxide ($Al_2O_3$) occurring native as corundum and in hydrated forms (such as gibbsite, boehmite and diaspore, all found in bauxite).

The term "Bayer process" is understood herein to mean the principal industrial means of refining bauxite to produce alumina.

The following general description of the Bayer process is drawn from a number of publications, primarily a publication entitled "The Bauxite Index"—thebauxiteindex.com/cbix/quarterly-plus.

The Bayer process uses a recirculating volume of concentrated caustic solution to dissolve alumina hydrate from bauxite, separate resultant solids/liquor, and then precipitate alumina tri-hydrate from the liquor. A subsequent calcining step transforms the tri-hydrate to alumina.

In the Bayer process, in addition to dissolving alumina hydrate, some of the silica minerals present in bauxite, such as kaolinite, are also dissolved and form a soluble sodium silicate. This reacts relatively slowly with the sodium aluminate in solution to form complex hydrated sodium aluminium silicates, known collectively as "desilication products" (DSP), which are of low solubility and eventually precipitate out of the liquor.

The basic steps of the Bayer process are as follows. The process liquor streams in the Bayer process are described herein as "Bayer liquor".

1. Comminution: Incoming bauxite is ground wet or dry to a smaller particle size and mixed with caustic soda liquor to form a slurry.
2. Pre-desilication: The slurry is sent to a pre-desilication step (65-100° C., atmospheric pressure) to pre-react any clays or other reactive silica-containing minerals in the bauxite and start the formation of desilication product (DSP). Pre-desilication minimizes the residence time of the slurry in the more expensive hot digestion stages and allows the desilication reaction to be completed during digestion.
3. Digestion: The pre-desilicated slurry is sent to a digestion step. The slurry is heated to between 100-300° C. depending on the type of bauxite. Additional caustic soda liquor may be added. The alumina and reactive silica dissolve and the silica re-precipitates as DSP, which contains caustic, alumina, silica and a sodium salt (sulfate, carbonate, aluminate, oxalate, hydroxide, chloride . . . ) depending on the availability of these in the liquor.
4. Flash cooling: The heated slurry is cooled to the atmospheric boiling point (105-110° C.) by allowing steam evaporation or flashing in a cascade of vessels. The bulk of the alumina remains dissolved in the liquor.
5. Clarification: The solid and liquid components of the slurry are separated using a cascade of settlers and washers to recover as much of the entrained liquor as possible. The resultant high solids content mud is sent to permanent disposal/storage site. The pregnant liquor is sent to polishing filtration to remove remaining solids content—helping avoid impurity contamination of the final product and preventing nuclei or fine particulate carryover to the precipitation process.
6. Precipitation: The pregnant liquor is gradually cooled to a temperature in the 40-79° C. range and circulated or allowed to stand in large vessels for a given residence time. The dissolved alumina precipitates as alumina tri-hydrate ($Al_2O_3.3H_2O$). Alumina tri-hydrate seed is added early in the process to accelerate precipitation and control the product quality (impurity content and granulometry). A classification step is then undertaken to separate the tri-hydrate to be used as seed and product.
7. Calcination: The alumina tri-hydrate ($Al_2O_3.3H_2O$) is calcined at 1,000° C. to drive off all chemically bound water, to leave alumina typically >99.5% $Al_2O_3$.
8. Evaporation: The spent liquor from the precipitation step is heated and subsequently cooled. The condensate is re-used in the process, for example as boiler feed water or for washing bauxite residue. The remaining spent liquor is recycled back to the digestion step.

The above steps 1-8 are hereinafter described herein as "the Bayer process".

Calcium oxide (CaO—lime) is used in the Bayer process for a range of reasons, including, by way of example, enhancing the extraction of alumina, controlling pregnant liquor impurities (primarily phosphorus), and recover caustic soda from sodium carbonate. The calcium oxide is also used in the fabrication of filter aid for the polishing filtration of the pregnant liquor. The present invention provides an alternative to the use of calcium oxide in the Bayer process.

The above description is not to be taken as an admission of the common general knowledge in Australia or elsewhere.

SUMMARY OF THE DISCLOSURE

The present invention is based on test work carried out by the applicant that showed that at least a part of the calcium oxide (lime—CaO) that is used in the Bayer process can be replaced by calcium fluoride ($CaF_2$) without having a detrimental impact on the process and with opportunities for process (including by-product recycling) and cost advantages.

The present invention provides a Bayer process that includes using calcium fluoride in the process.

The present invention provides a Bayer process that includes:
contacting bauxite and calcium fluoride with sodium hydroxide, and forming a slurry, with the calcium fluoride may provide at least 1 wt. % of the calcium added to the process, and
precipitating alumina from the slurry.

The Bayer process may include steps 1-8 described above, namely: comminution, pre-desilication, digestion, flash cooling, clarification, precipitation, calcination, and spent liquor evaporation steps.

It is noted that the invention is not confined to steps 1-8. For example, the pre-desilication step is optional and may be replaced by a slurry storage (holding tank) step. In addition, the spent liquor evaporation step is optional.

In this context, the invention is compatible with any Bayer process flowsheet: such as high temperature, low temperature, double digestion, and high temperature with sweetening.

The calcium fluoride may be added to the process in a solid form or as a solution, or a suspension in a liquid.

The calcium fluoride may be added to the process in any one or more than one of the comminution, pre-desilication, digestion, flash cooling and clarification steps of the process.

By way of example, the calcium fluoride may be added in the comminution step, typically with CaO.

By way of example, the calcium fluoride may be added as a feed material to the pre-desilication step of the process.

The calcium fluoride may provide at least 10 wt. % of the calcium added to the process.

The calcium fluoride may provide at least 25 wt. % of the calcium added to the process.

The calcium fluoride may provide at least 50 wt. % of the calcium added to the process.

The calcium fluoride may provide 100 wt. % of the calcium added to the process and thereby totally replace other sources of calcium such as calcium oxide.

The process may include adding calcium oxide in any one or more than one of the comminution, pre-desilication, digestion, flash-cooling or clarification steps of the process.

By way of example, calcium oxide may be added as a feed material to the comminution and pre-desilication steps of the process.

As noted above, calcium oxide has a number of purposes in the Bayer process. One purpose is the removal of phosphorus from pregnant liquor. The test work carried out by the applicant showed that calcium fluoride is also effective for this purpose and for other purposes of calcium oxide. In particular, the applicant has found that calcium fluoride performs the same functions as calcium oxide, including the ability to precipitate phosphorus-containing compounds from the pregnant liquor. The applicant believes that this occurs because calcium ions released from the calcium fluoride into solution react with dissolved phosphorus-containing compounds and precipitate as insoluble compounds such as carbonate apatite, thereby reducing the amounts of phosphorus-containing compounds in the liquor and ultimately in alumina precipitated from the liquor.

The replacement of at least some calcium oxide by calcium fluoride in the invention has benefits from a cost and waste management perspective, as discussed further below.

The process may include precipitating a calcium-phosphorus-fluorine-containing compound from the slurry as a consequence of the addition of the calcium fluoride to the process and thereby reducing the phosphorus concentration in the liquor.

The precipitation of the calcium-phosphorus-fluorine-containing compound may remove fluoride from the liquor.

The calcium-phosphorus-fluorine-containing compound may be in the form of carbonate-apatite including $(Ca, Na)_5(PO_4 \cdot CO_2OH)(OH, F, Cl))$ or $Ca_5(PO_4)_3(F, Cl, OH)$.

The calcium fluoride used in the process may have a purity ranging from 40-100%.

Suitably, the calcium fluoride has a purity ranging from 60-90%.

The calcium fluoride may be obtained from any suitable source.

For example, the calcium fluoride may be obtained from a low caustic leaching and liming (LCLL) process.

Suitably, the calcium fluoride is obtained from a LCLL process of a spent potlining treatment plant.

BRIEF DESCRIPTION OF THE DRAWINGS

The present invention is described by way of example only, with reference to the accompanying drawings, wherein.

DESCRIPTION OF EMBODIMENT

The invention is Bayer process that includes contacting bauxite and calcium fluoride with sodium hydroxide and forming a slurry and precipitating alumina from the slurry.

Figure 2:
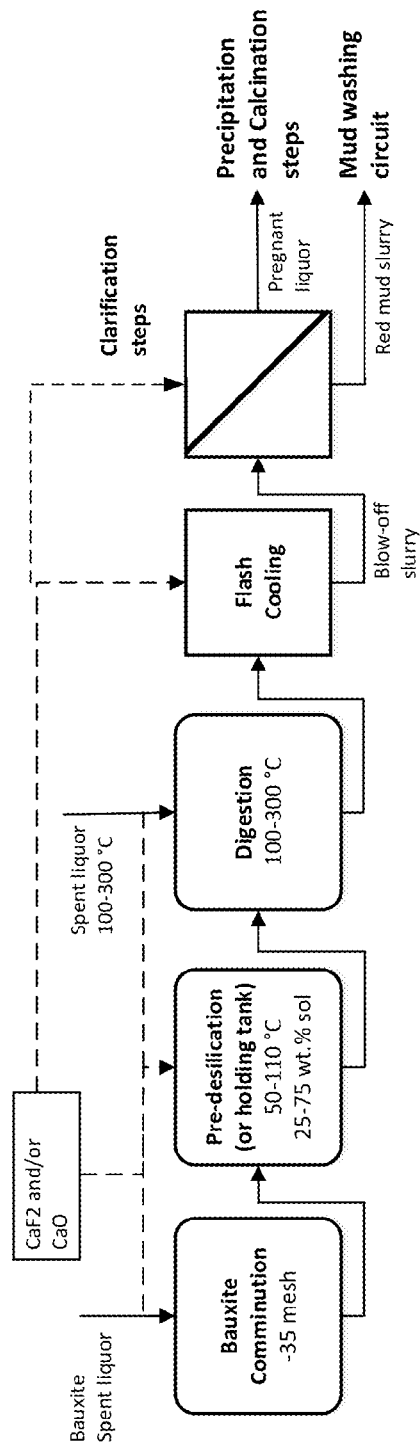
FIG. 2 is a Bayer process flowsheet (double-stream configuration) in accordance with one embodiment of the invention which illustrates options for adding $CaF_2$ and/or CaO, with the flowsheet illustrating the digestion process, in double-stream configuration, noting that the sweetening and double-digestion steps are not illustrated in the figure.

FIG. 2 is an embodiment of the invention.

The Figure is a Bayer process flowsheet (double-stream configuration) which illustrates options for adding $CaF_2$ and/or CaO, with the flowsheet illustrating the digestion process, in double-stream configuration, noting that the sweetening and double-digestion steps are not illustrated in the Figure.

The options include any one or more than one of the comminution, de-silication, digestion, flash cooling and clarification steps. The selection of the step or steps in any given situation will depend on a range of factors, such as feed material, plant operating conditions, etc, known to the skilled person.

As noted above, the invention is based on test work carried out by the applicant that showed that at least a part of the calcium oxide (lime—CaO) that is used in the Bayer process can be replaced by calcium fluoride ($CaF_2$) without having a detrimental impact on the process and having process (including by-product recycling) and cost advantages.

The opportunity presented by the invention can be understood by considering the spent potlining treatment plant of a Group Company of the applicant that is located in the Saguenay area (Canada) and the nearby Vaudreuil alumina refinery of a Group Company of the applicant. The spent potlining treatment plant generates calcium fluoride as a by-product of a low caustic leaching and liming (LCLL) process. Using this calcium fluoride ($CaF_2$) in an alumina refinery represents an opportunity to beneficially use this by-product and achieve a reduction in calcium oxide requirements and associated costs in the Bayer process. There is an upstream benefit of reducing $CO_2$ emissions otherwise incurred during calcium oxide production.

The purpose of the test work was to investigate proof of concept of the invention at a small scale and a laboratory scale, i.e. proof of concept of the use of $CaF_2$ in digestion as an alternative or complementary to CaO.

The test work focused on the control of the phosphorus concentration in the Bayer liquor in the plant and thereby to prevent high phosphorus levels in the smelter grade alumina produced in the plant. The invention is not confined to this purpose for the replacement of lime in the Bayer process.

The test work investigated whether and to what extent $CaF_2$ could replace CaO.

Figure 1:
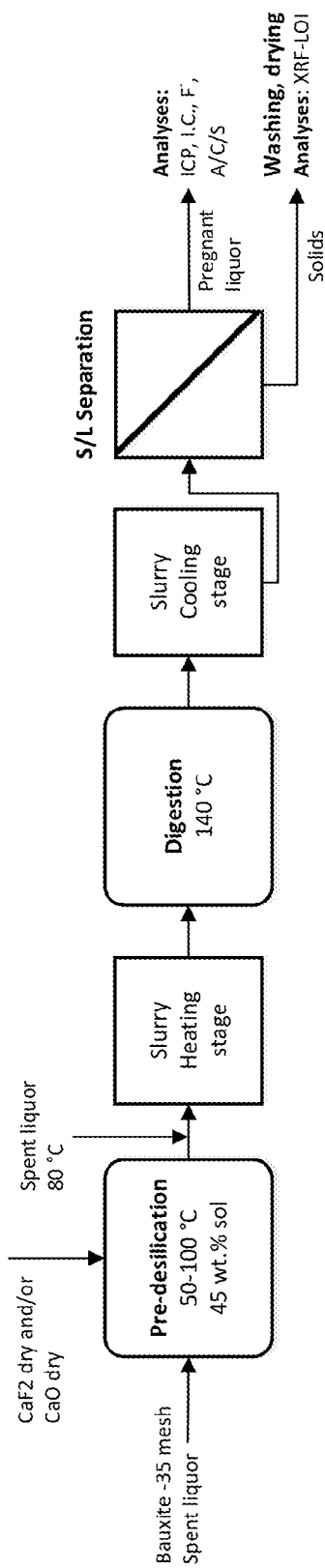
FIG. 1 is a small-scale experiments flowsheet (single-stream configuration)

The test work included a series of small scale digestion tests summarised in FIG. 1.

With reference to FIG. 1, the digestion tests included a pre-desilication step, a digestion step, and a solid/liquid separation step.

The tests were carried out using various proportions of $CaF_2$ and CaO to investigate the impact of $CaF_2$ on digestion (alumina extraction, desilication reactions, phosphorus control, fluoride accumulation, and other impurities release, such as carbonate, in the liquor).

With reference to FIG. 1, bauxite passing a 35-mesh sieve, refinery spent liquor, and various proportions of dry $CaF_2$ and CaO were supplied to the pre-desilication step and formed a desilication slurry at 50-100° C. and 45% solids on a weight basis.

The resultant desilication slurry was transferred to the digestion step via a heating step. A given volume of spent liquor at 80° C. was added to the desilication slurry upstream of the heating step.

The heating step heated the slurry to the target digestion temperature. Digestion was carried out at 140° C. to achieve a target alumina to caustic soda (A/C) ratio.

A resultant digestion slurry was then cooled in an iced-water bath until atmospheric pressure was reached.

The resultant cold slurry was transferred to the solid/liquid separation step and produced a pregnant liquor and washed solids. The pregnant liquor and washed solids were subjected to a series of analysis tests.

The test work was carried out using two types of $CaF_2$, namely: so-called "low lime excess $CaF_2$" (LLE $CaF_2$) and "high lime excess $CaF_2$" (HLE $CaF_2$), both derived from the low caustic leaching and liming process of a spent potlining treatment plant.

| Compound | LLE $CaF_2$ (wt. %) | HLE $CaF_2$ (wt. %) |
| --- | --- | --- |
| $Al_2O_3$ | 1-2 | 8-9 |
| $SiO_2$ | 1-2 | 1-2 |
| $CaCO_3$ | 8-9 | 5-6 |
| $Ca(OH)_2$ | 3-4 | 17-18 |
| Others | 4-5 | 3-4 |
| $CaF_2$ purity | 80-81 | 64-65 |

The test work was carried out using CaO sampled at the plant with the following composition:

| Compound | wt. % |
| --- | --- |
| $SiO_2$ | 0-2 |
| MgO | 0-3 |
| CaO | 70-95 |
| LOI and other impurities | 0-30 |

The results of some of the test work are summarized in FIGS. 3-9 and discussed below.

Figure 3:
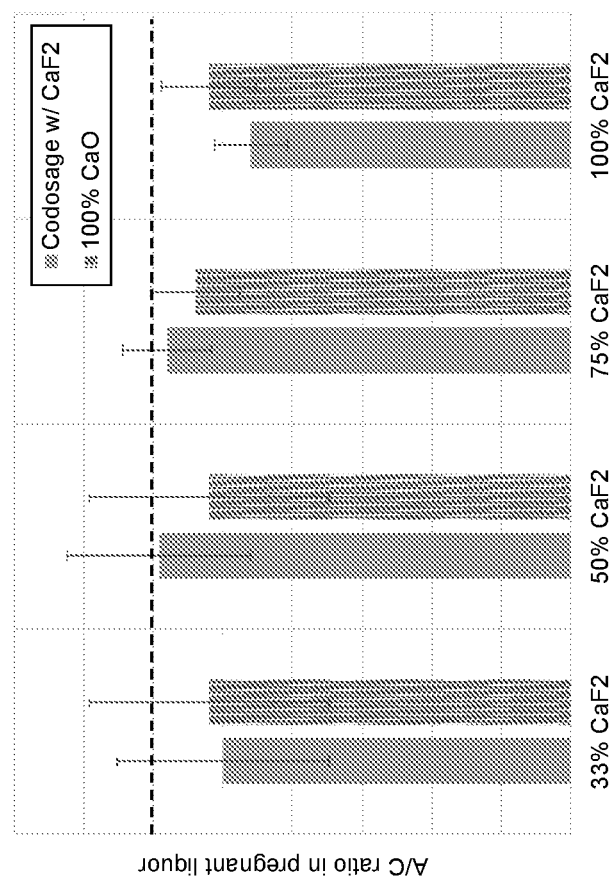
FIG. 3 presents digestion results with "LLE" CaF2 (mean values±std. dev)–A/C ratio, noting that the 100% CaO case is specific to each series of tests since it is replicated to make sure to have the exact same conditions, and therefore, the 100% CaO case results might differ from a co-dosage test to another.

FIG. 3—Alumina to Caustic (A/C) Ratio

FIG. 3 is a graph illustrating the alumina to caustic (A/C) ratio for digestion tests run using $CaF_2$ and CaO in various concentrations of $CaF_2$ and CaO.

Points to note from FIG. 3 are as follows:

Promising results in that there was no negative impact on A/C ratio when $CaF_2$ was added to digestion.

The tests for paired data comparing the mean value of the base case (100% CaO) to the results with various proportions of $CaF_2$ showed no significant differences, with p values ranging from 0,749 to 0.06 and a CI of 95%.

The A/C ratio for all of the tests was close to the target A/C ratio, although a few tests showed a standard deviation of more than 5 ratio points (0.005).

Figure 4:
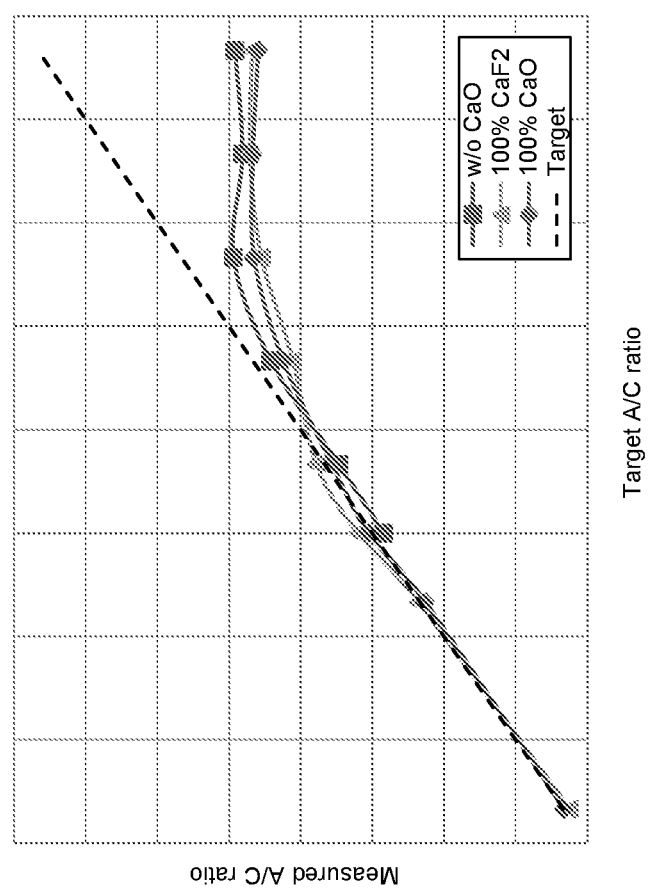
FIG. 4 presents digestion results with "LLE" $CaF_2$-breakpoint analysis, noting that the graph illustrates breakpoint analysis curves based on alumina extraction for tests run using either "LLE" $CaF_2$ or lime, both compared to a "witness test" without lime addition.

FIG. 4—Breakpoint Analysis

FIG. 4 presents digestion results with "LLE" $CaF_2$. The graph provides breakpoint analysis curves based on alumina extraction for tests run using either "LLE" $CaF_2$ or lime, both compared to a "witness test" without lime addition.

The graph indicates promising results in that there was no negative impact on A/C ratio and A/C solubility limit margin when $CaF_2$ was added to digestion, which supports the results shown in FIG. 3.

The 100% $CaF_2$ addition test showed similar, almost identical, results as the base case (100% CaO).

Figure 5:
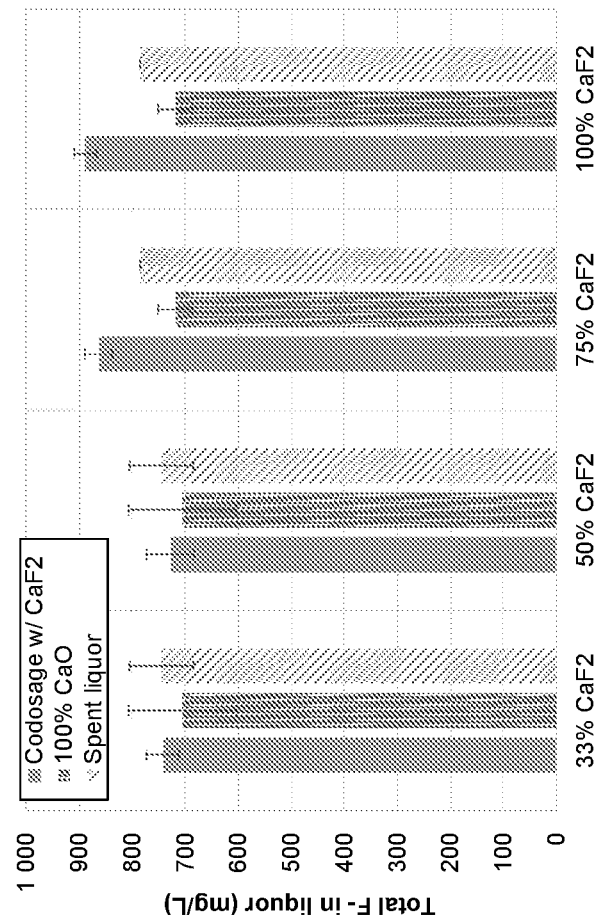
FIG. 5 presents digestion results with "LLE" $CaF_2$-fluoride concentration (mean values±std. dev), noting that the 100% CaO case is specific to each series of tests since it is replicated to make sure to have the exact same conditions, and therefore, the 100% CaO case results might differ from a co-dosage test to another.

FIG. 5—$F^-$ Concentration in Pregnant and Spent Liquors

FIG. 5 is a graph illustrating the $F^-$ concentration in pregnant and spent liquors for digestion tests run using low lime excess CaF2 (LLE CaF2) and CaO in various proportions.

FIG. 5 illustrates the effect of varying the amount of $CaF_2$ on the $F^-$ concentration in the spent liquor before and after the digestion step.

Desirably, accumulation of F⁻ in the liquor is minimized and there is little or no difference between the base case and the co-dosage tests, knowing that bauxite contains small concentrations of fluorine and that it might be deported into the liquor during digestion.

Points to note from FIG. 5 are as follows:
Promising results for the tests with 33/67 wt. % $CaF_2$/CaO addition, and 50/50 wt. % $CaF_2$/CaO addition.
The concentration of fluoride in the spent liquor was similar or greater than in the pregnant liquor in most of the tests (not 75% neither 100%).
The concentration of fluoride in the pregnant liquor for the tests 75/25 and 100% $CaF_2$ was significantly higher than the base case.

Figure 6:
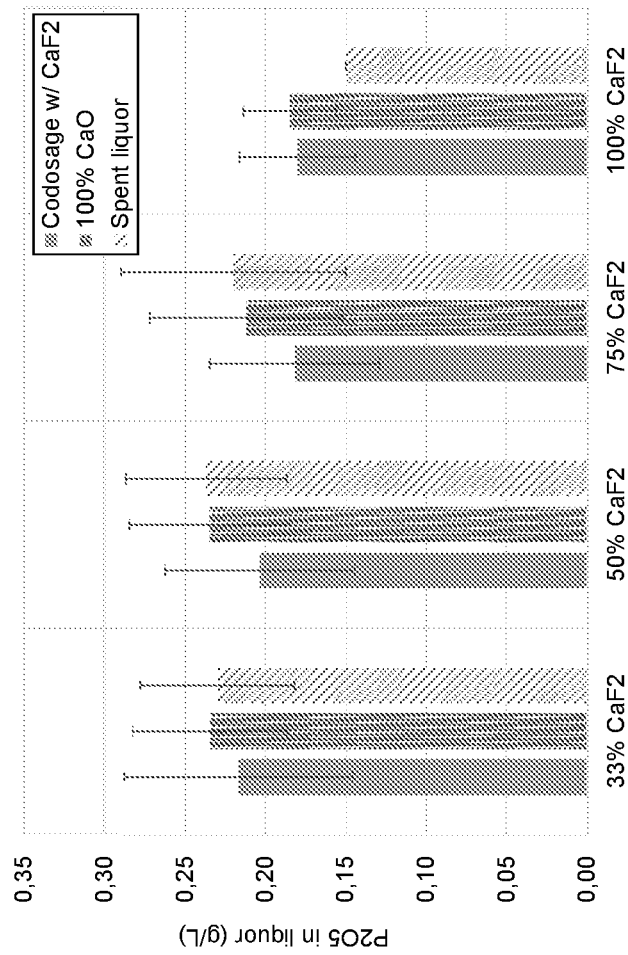
FIG. 6 presents digestion results with "LLE" $CaF_2$-phosphorus concentration (mean values±std. dev), noting that the 100% CaO case is specific to each series of tests since it is replicated to make sure to have the exact same conditions, and therefore, the 100% CaO case results might differ from a co-dosage test to another.

FIG. 6—Phosphorus Concentration in Pregnant and Spent Liquors

FIG. 6 is a graph illustrating the phosphorus concentration in pregnant and spent liquors for digestion tests run using low lime excess $CaF_2$ (LLE $CaF_2$) and CaO in various proportions of $CaF_2$ and CaO.

The graph illustrates the effect of varying the amount of $CaF_2$ on the phosphorus concentration before and after the digestion step. Desirably, the control of phosphorus in the pregnant liquor is maintained or improved when adding $CaF_2$.

Points to note from FIG. 6 are as follows:
Promising results for all the co-dosage tests in that they show an effective phosphorus control.
The tests for paired data comparing the mean value of phosphorus in the pregnant liquor of the base case (100% CaO) to the 75/25 and 100% $CaF_2$ addition tests showed no significant differences, with p values of 0,631 and 0,162. The 33/67 and 50/50 tests showed significantly enhanced phosphorus control.

Figure 7:
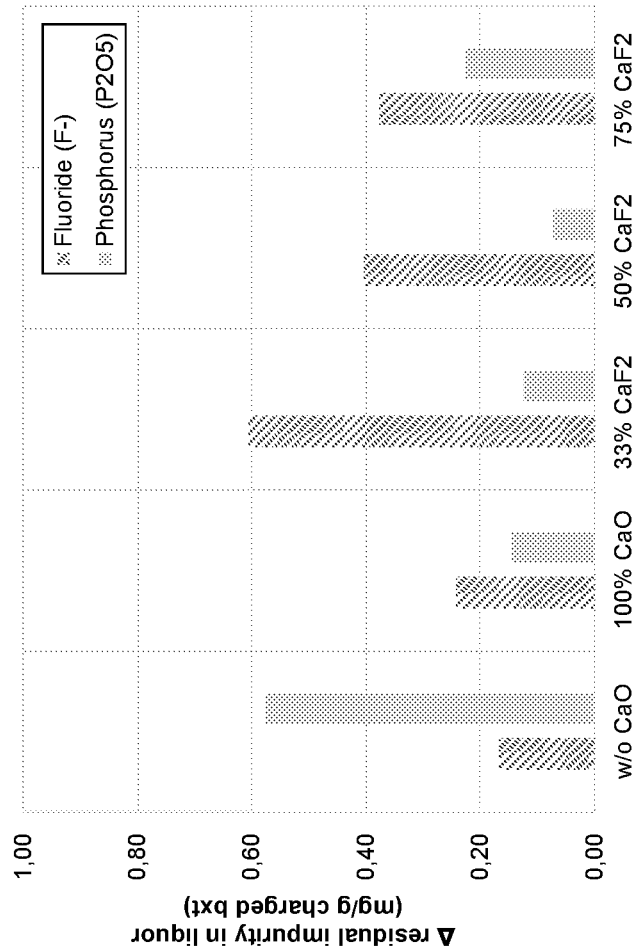
FIG. 7 presents digestion results with "BILE" $CaF_2$-phosphorus and fluoride accumulation (mean values), with the graph illustrating the mass variation per gram of digested bauxite of both phosphorus and fluoride in liquor for tests run using "HLE" $CaF_2$ and CaO in various proportions.

FIG. 7—Mass Variation of Phosphorus in Liquors

FIG. 7 is a graph illustrating the mass variation of phosphorus in liquors for digestion tests run using purified or high lime excess $CaF_2$ (BILE $CaF_2$) and CaO in various proportions of $CaF_2$ and CaO.

Points to note from FIG. 7 are as follows:
A good phosphorus control for the tests in co-dosage with $CaF_2$, compared to the test without lime addition, showing the potential of "BLE"-$CaF_2$/CaO mixtures to fulfil this function in the Bayer process.
The phosphorus control obtained in co-dosage with $CaF_2$ was enhanced in most cases or comparable to the one obtained with the base case (100% CaO).
The fluoride accumulation was significantly higher than the base case (100% CaO) in all co-dosage tests, probably due to a different composition of $CaF_2$ when produced with high lime excess.

Figure 8:
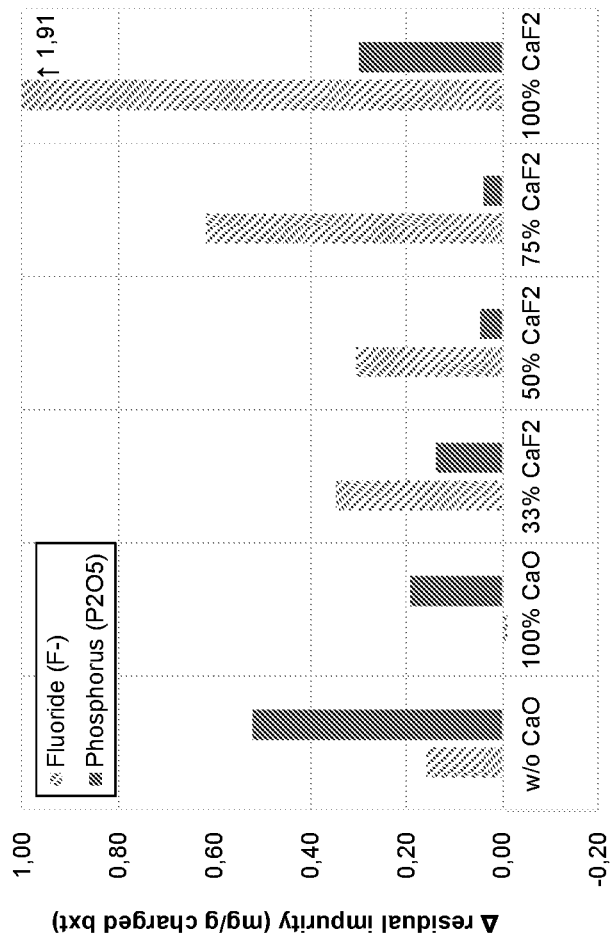
FIG. 8 presents digestion results with "LLE" $CaF_2$-phosphorus and fluoride accumulation (mean values), with the graph illustrating the mass variation per gram of digested bauxite of both phosphorus and fluoride in liquor for tests run using "LLE" $CaF_2$ and CaO in various proportions.

FIG. 8—LLE $CaF_2$-Phosphorus and Fluoride Accumulation

FIG. 8 presents digestion results with "LLE" $CaF_2$-phosphorus and fluoride accumulation (mean values). The graph illustrates the mass variation per gram of digested bauxite of both phosphorus and fluoride in liquor for tests run using "LLE" $CaF_2$ and CaO in various proportions Points to note from FIG. 8 are as follows:
Good phosphorus control for the tests in co-dosage with $CaF_2$, compared to the test without lime addition, showing the potential of $CaF_2$/CaO mixtures to fulfil this function in the Bayer process.
A slight increase in F− in liquor, however not significant, for the tests with 33/67 and 50/50 addition, and a significantly higher accumulation with 75/25 and 100% $CaF_2$ compared to the base case.

Figure 9:
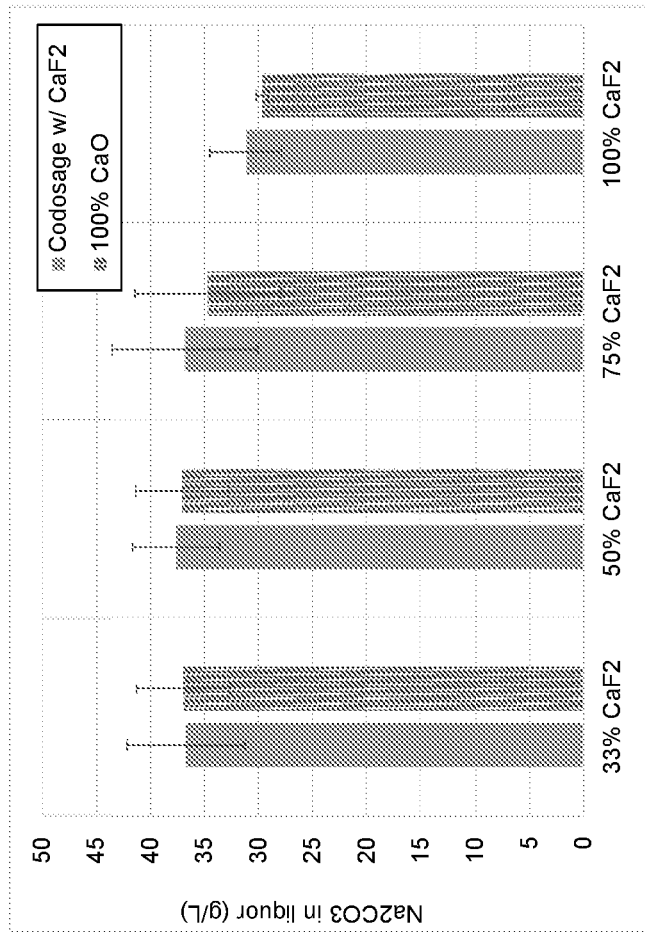
FIG. 9 presents digestion results with "LLE" $CaF_2$-carbonate concentration (mean values±std. dev), noting that the 100% CaO case is specific to each series of tests since it is replicated to make sure to have the exact same conditions, and therefore the 100% CaO case results might differ from a co-dosage test to another, and with the graph illustrating the carbonate concentration in the pregnant liquor for tests run using "LLE" $CaF_2$ and CaO at various proportions, compared to the base case using only CaO.

FIG. 9—"LLE" $CaF_2$-Carbonate Concentration (Mean Values±Std. Dev)

FIG. 9 presents digestion results with "LLE" $CaF_2$-carbonate concentration (mean values±std. dev).

The 100% CaO case is specific to each series of tests since it is replicated to make sure to have the exact same conditions, and therefore the 100% CaO case results might differ from a co-dosage test to another.

The graph illustrates the carbonate concentration in the pregnant liquor for tests run using "LLE" $CaF_2$ and CaO in various proportions, compared to the base case using only CaO.

Points to note from FIG. 8 are as follows:
Promising results in that there was no significant carbonate increase in the liquor when "LLE" CaF2 was added to digestion.
The tests for paired data comparing the mean value of carbonate in the pregnant liquor of the base case (100% CaO) to the $CaF_2$ co-dosage tests showed no significant differences, with p values ranging from 0,791 to 0,334, and a CI of 95%.

Summary of Results in FIGS. 3-9
Partial replacement of CaO with $CaF_2$ was successful from a number of viewpoints of:
A/C ratio target achievement in digestion and no significant difference compared to the base case;
The breakpoint analysis results support the fact that the addition of $CaF_2$ did not impact adversely the extraction of alumina.
Good phosphorus control for the tests in co-dosage with $CaF_2$, compared to the test without lime addition, showing the potential of $CaF_2$/CaO mixtures to fulfil this function in the Bayer process.
A slight increase in F− in liquor, however not significant, for the tests with 33/67 and 50/50 addition, and a significantly higher accumulation with 75/25 and 100% $CaF_2$ compared to the base case.
Promising results in that there was no significant carbonate increase in the liquor when "LLE" CaF2 was added to digestion.

It is noted that the results reported above in relation to FIGS. 3-9 are shown only as an example of proof of concept performed in a very smaller scale than the refinery scale, and that they are closely dependent of the type and origin of bauxite used, the impurities present in the refinery liquor, and the conditions of digestion, and other plant operating conditions.

It is also noted that the results reported above in relation to FIGS. 3-9 provide a level of confidence that the process can be a viable process at a refinery scale and can achieve the advantages mentioned.

Many modifications may be made to the embodiment of the invention described above without departing from the spirit and scope of the invention.

The invention claimed is:
1. A Bayer process that includes:
contacting bauxite and calcium fluoride with sodium hydroxide and forming a slurry, with the calcium fluoride providing at least 1 wt. % of the calcium added to the process to precipitate phosphorus-containing compounds from the slurry, and
precipitating alumina from a pregnant liquor of the slurry.
2. The process defined in claim 1 including the following steps: comminution, digestion, flash cooling, clarification, precipitation, and calcination steps, and may include optional pre-desilication and spent liquor evaporation steps.

3. The process defined in claim 1 including adding calcium fluoride in a solid form or as a suspension or solution in liquid.

4. The process defined in claim 2 including adding calcium fluoride in any one or more than one of the comminution, pre-desilication, digestion, flash-cooling and clarification steps of the process.

5. The process defined in claim 1 wherein the calcium fluoride provides at least 10 wt. % of the calcium added to the process.

6. The process defined in claim 1 wherein the calcium fluoride provides at least 25 wt. % of the calcium added to the process.

7. The process defined in claim 1 wherein the calcium fluoride provides at least 50 wt. % of the calcium added to the process.

8. The process defined in claim 1 wherein the calcium fluoride provides 100 wt. % of the calcium added to the process.

9. The process defined in claim 4 including adding calcium oxide in any one or more than one of the comminution, pre-desilication, digestion, flash-cooling and clarification steps.

10. The process defined in claim 1 including adding an amount of calcium fluoride sufficient to precipitate a calcium-phosphorus-fluorine-containing compound and/or a calcium-phosphorus containing compound from the slurry and thereby reducing the phosphorus concentration in the pregnant liquor.

11. The process defined in claim 10 wherein the calcium-phosphorus-fluorine-containing compound is in the form of carbonate-apatite including $(Ca, Na)_5(PO_4 \cdot CO_2OH)(OH, F, Cl)$ or $Ca_5(PO_4)_3(F, Cl, OH)$.

12. The process defined in claim 10 wherein the calcium-phosphorus-fluorine-containing compound is fluorapatite $(Ca_5(PO_4)_3F)$.

13. The process defined in claim 1 wherein the calcium fluoride has a purity ranging from 40-100%.

14. The process defined in claim 1 including obtaining the calcium fluoride from a low caustic leaching and liming (LCLL) process, and using the calcium fluoride in the contacting process step.

15. The process defined in claim 1 wherein the calcium fluoride is obtained from any suitable source.

16. The process defined in claim 1 wherein the calcium added to the process includes calcium oxide.

17. The process defined in claim 1 wherein the calcium added to the process includes low lime excess CaF2 containing 80-81% $CaF_2$, 8-9% $CaCO_3$, and 3-4% $Ca(OH)_2$.

18. The process defined in claim 1 wherein the calcium added to the process includes high lime excess CaF2 containing 64-65% $CaF_2$, 5-6% $CaCO_3$, and 17-18% $Ca(OH)_2$.

19. A Bayer process that includes:
contacting bauxite and calcium fluoride with sodium hydroxide and forming a slurry, with the calcium fluoride providing at least 1 wt. % of the calcium added to the process,
wherein the slurry includes an amount of calcium fluoride sufficient to precipitate a calcium-phosphorus-fluorine-containing compound and/or a calcium-phosphorus containing compound from a pregnant liquor of the slurry and thereby reducing the phosphorus concentration in the slurry, and precipitating alumina from the slurry pregnant liquor.

20. A Bayer process that includes:
contacting boehmite-containing and/or gibbsite-containing bauxite and calcium fluoride with sodium hydroxide and forming a slurry, with the calcium fluoride providing at least 1 wt. % of the calcium added to the process to precipitate phosphorus-containing compounds from the slurry, and precipitating alumina from a pregnant liquor of the slurry.

21. A Bayer process that includes:
contacting bauxite and calcium fluoride with sodium hydroxide and forming a slurry, with the calcium fluoride providing at least 1 wt. % of the calcium added to the process, and precipitating alumina from a pregnant liquor of the slurry; wherein the calcium added to the process includes
low lime excess CaF2 containing 80-81% $CaF_2$, 8-9% $CaCO_3$, and 3-4% $Ca(OH)_2$; or
high lime excess CaF2 containing 64-65% $CaF_2$, 5-6% $CaCO_3$, and 17-18% $Ca(OH)_2$.

* * * * *